United States Patent
Dirnberger et al.

(10) Patent No.: US 10,047,767 B2
(45) Date of Patent: Aug. 14, 2018

(54) MOTOR PUMP UNIT FOR A HIGH-PRESSURE CLEANING APPLIANCE, AND HIGH-PRESSURE CLEANING APPLIANCE

(71) Applicant: Alfred Kärcher GmbH & Co. KG, Winnenden (DE)

(72) Inventors: Sven Dirnberger, Steinheim (DE); Timo Spengler, Weil der Stadt (DE); Rudi Bareiter, Burgstetten (DE); Markus Fischer, Winnenden (DE); Juergen Kloepfer, Burgstetten (DE); Alexander Rubbe, Winnenden (DE)

(73) Assignee: Alfred Kärcher GmbH & Co. KG, Winnenden (DE)

( * ) Notice: Subject to any disclaimer, the term of this patent is extended or adjusted under 35 U.S.C. 154(b) by 1414 days.

(21) Appl. No.: 13/909,650

(22) Filed: Jun. 4, 2013

(65) Prior Publication Data
US 2013/0263899 A1 Oct. 10, 2013

Related U.S. Application Data

(63) Continuation of application No. PCT/EP2010/069664, filed on Dec. 14, 2010.

(51) Int. Cl.
*B08B 3/02* (2006.01)
*F04D 29/58* (2006.01)
(Continued)

(52) U.S. Cl.
CPC .............. *F04D 29/586* (2013.01); *B08B 3/02* (2013.01); *B08B 3/026* (2013.01); *F04B 17/03* (2013.01);
(Continued)

(58) Field of Classification Search
None
See application file for complete search history.

(56) References Cited

U.S. PATENT DOCUMENTS

| 2,338,154 A | 1/1944 | Wilkinson |
| 3,525,001 A | 8/1970 | Erickson |

(Continued)

FOREIGN PATENT DOCUMENTS

| CN | 2742659 | 11/2005 |
| DE | 35 45 665 | 7/1987 |

(Continued)

*Primary Examiner* — Michael Barr
*Assistant Examiner* — Jason Riggleman
(74) *Attorney, Agent, or Firm* — Womble Bond Dickinson (US) LLP

(57) ABSTRACT

A motor pump unit for a high-pressure cleaning appliance is provided, in which the cleaning liquid conveyed by the pump assembly is used for cooling the motor, comprising a motor housing which surrounds the motor, and a cooling channel which surrounds the motor and through which the cleaning liquid can flow for heat dissipation. To provide a motor pump unit having a level of electrical safety which is higher than that of a conventional motor pump unit, the cooling channel surround the motor housing, and the motor pump unit comprise at least one thermally conductive spacer element by way of which the cooling channel is spaced from the motor housing. A high-pressure cleaning appliance is also provided.

18 Claims, 7 Drawing Sheets

(51) Int. Cl.
*F04B 17/03* (2006.01)
*F04B 53/08* (2006.01)
*F04B 53/16* (2006.01)
*H02K 5/20* (2006.01)
*H02K 7/14* (2006.01)
*H02K 9/19* (2006.01)

(52) U.S. Cl.
CPC .............. *F04B 53/08* (2013.01); *F04B 53/16* (2013.01); *H02K 5/20* (2013.01); *F04B 2203/0205* (2013.01); *F05C 2201/021* (2013.01); *F05C 2201/903* (2013.01); *H02K 7/14* (2013.01); *H02K 9/19* (2013.01)

(56) References Cited

U.S. PATENT DOCUMENTS

| | | | |
|---|---|---|---|
| 3,897,178 A | 7/1975 | Palloch | |
| 4,480,967 A | 11/1984 | Schulze | |
| 6,146,113 A | 11/2000 | Fassnacht et al. | |
| 8,920,138 B2 * | 12/2014 | Schiffhauer | F04B 1/12 417/366 |
| 2007/0224058 A1 | 9/2007 | Haseley | |
| 2008/0303359 A1 | 12/2008 | Oestreich | |
| 2010/0047091 A1 | 2/2010 | Schiffhauer et al. | |
| 2012/0034111 A1 | 2/2012 | Schiffhauer et al. | |
| 2012/0034112 A1 | 2/2012 | Schiffhauer et al. | |
| 2012/0195772 A1 | 8/2012 | Schiffhauer et al. | |

FOREIGN PATENT DOCUMENTS

| | | | |
|---|---|---|---|
| DE | 198 49 573 | | 5/2000 |
| EP | 0 503 093 | | 9/1992 |
| EP | 0 585 644 | | 3/1994 |
| GB | 246323 | | 1/1926 |
| JP | 7-322567 | | 12/1995 |
| WO | WO 97/44882 | | 11/1997 |
| WO | PCT/EP2009/0001026 | * | 8/2010 |
| WO | WO 2010/091698 | | 8/2010 |
| WO | WO 2010/091699 | | 8/2010 |
| WO | WO 2010/091965 | | 8/2010 |

* cited by examiner

MOTOR PUMP UNIT FOR A HIGH-PRESSURE CLEANING APPLIANCE, AND HIGH-PRESSURE CLEANING APPLIANCE

CROSS-REFERENCE TO RELATED APPLICATIONS

This application is a continuation of international application number PCT/EP2010/069664, filed on Dec. 14, 2010, which is incorporated herein by reference in its entirety and for all purposes.

FIELD OF THE INVENTION

The present invention relates to a motor pump unit for a high-pressure cleaning appliance, in which the cleaning liquid conveyed by the pump assembly is used for cooling the motor, comprising a motor housing which surrounds the motor, and a cooling channel which surrounds the motor and through which the cleaning liquid can flow for heat dissipation.

The present invention also relates to a high-pressure cleaning appliance with a motor pump unit.

BACKGROUND OF THE INVENTION

A motor pump unit of the kind mentioned at the outset is described in DE 31 15 698 C1, for example. To protect the motor, a motor housing surrounding its rotor and stator in the form of a shell is provided. The heat of the motor can also be dissipated by way of the motor housing. A part of the suction line for cleaning liquid located upstream of the pump assembly forms a cooling channel for cooling the motor housing. DE 31 15 698 C1 proposes integrally forming the cooling channel as annular gap in the motor housing surrounding the motor. Alternatively, provision may be made to form the cooling channel as a helical tube embedded in the motor housing.

Motor pump units are also known in the prior art, in which the cooling channel is in the form of a cooling pot, through which the drawn-in cleaning liquid flows, and into which the motor housing projects.

The cleaning liquid is usually water, which may have a cleaning chemical added to it to increase the cleaning effect. The cleaning liquid may be so aggressive that in conventional motor pump units, as a result of corrosion of the walls of the cooling channel and, in particular, of the motor housing, it enters the interior thereof and, consequently, jeopardizes the electrical safety of the motor pump unit.

An object underlying the present invention is to provide a motor pump unit of the kind mentioned at the outset and a high-pressure cleaning appliance having a higher level of electrical safety than a conventional motor pump unit and a conventional high-pressure cleaning appliance, respectively.

SUMMARY OF THE INVENTION

In a first aspect of the invention, a motor pump unit for a high-pressure cleaning appliance comprises a motor and a pump driven by the motor, in which motor pump unit the cleaning liquid conveyed by the pump assembly is used for cooling the motor, comprising a motor housing which surrounds the motor, and a cooling channel which surrounds the motor and through which the cleaning liquid can flow for heat dissipation. The cooling channel surrounds the motor housing, and the motor pump unit comprises at least one thermally conductive spacer element by way of which the cooling channel is spaced from the motor housing.

In a second aspect of the invention, a high-pressure cleaning appliance comprises a motor pump unit. The motor pump unit comprises a motor and a pump driven by the motor, in which motor pump unit the cleaning liquid conveyed by the pump assembly is used for cooling the motor, comprising a motor housing which surrounds the motor, and a cooling channel which surrounds the motor and through which the cleaning liquid can flow for heat dissipation. The cooling channel surrounds the motor housing, and the motor pump unit comprises at least one thermally conductive spacer element by way of which the cooling channel is spaced from the motor housing.

BRIEF DESCRIPTION OF THE DRAWING FIGURES

The foregoing summary and the following description may be better understood in conjunction with the drawing figures, of which:

DETAILED DESCRIPTION OF PREFERRED EMBODIMENTS OF THE INVENTION

Figure 1:
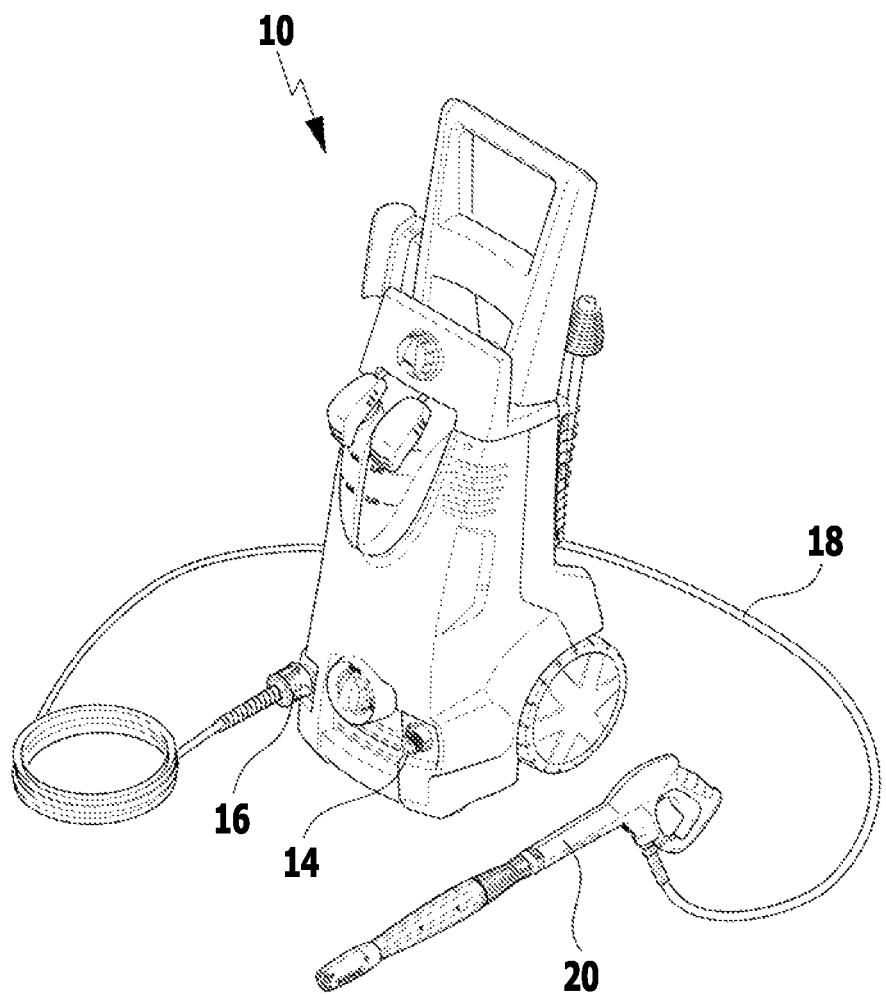
FIG. 1 is a perspective representation of a preferred embodiment of a high-pressure cleaning appliance in accordance with the invention, comprising a preferred embodiment, shown in FIGS. 2 to 4, of a motor pump unit in accordance with the invention.

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a motor pump unit for a high-pressure cleaning appliance, the motor pump unit comprising a motor and a pump driven by the motor, in which motor pump unit the cleaning liquid conveyed by the pump assembly is used for cooling the motor, comprising a motor housing which surrounds the motor, and a cooling channel which surrounds the motor and through which the cleaning liquid can flow for heat dissipation. The cooling channel surrounds the motor housing, and the motor pump unit comprises at least one thermally conductive spacer element by way of which the cooling channel is spaced from the motor housing.

The aforementioned design of the motor pump unit in accordance with the invention makes provision of an interspace between the motor housing and the cooling channel possible. The interspace is bridged by the at least one spacer element which places the cooling channel, in relation to the motor, at a radial distance from the motor housing. If the cooling channel corrodes under the influence of the cleaning liquid, the cleaning liquid is able to enter the interspace between the motor housing and the cooling channel. However, the motor remains protected from the cleaning liquid collecting in the interspace by the motor housing which is not corroded, with the result that the level of electrical safety of the motor pump unit in accordance with the invention is higher than that of conventional motor pump units. Nevertheless, cooling of the motor can be ensured. Because the at least one spacer element is thermally conductive, waste heat of the motor can be dissipated in a targeted manner from the motor housing to the cleaning liquid in the cooling channel.

It is expedient for the interspace formed between the motor housing and the cooling channel and bridged by the at least one spacer element to be filled with gas. Firstly, the low thermal conductivity of the gas, in particular, air, allows the waste heat of the motor to be dissipated in a targeted manner by way of the at least one spacer element from the motor housing to the cooling channel. Secondly, the high compressibility of the gas enables a relatively large quantity of cleaning liquid exiting from the cooling channel to be received in the interspace.

It is advantageous if the at least one spacer element is formed in one piece with the motor housing and/or if the at least one spacer element is formed in one piece with an inner wall of the cooling channel that faces the motor housing. This enables constructionally simple manufacture of the motor pump unit. "Motor housing" may in this context also relate to the substantial part of the motor housing surrounding the motor. For example, the motor housing comprises a housing shell which surrounds the motor and is produced in one piece with the at least one spacer element. It is particularly preferred for the motor housing, the at least one spacer element and at least the inner wall of the cooling channel to be formed in one piece. "Inner wall" means in this context a wall, facing the motor housing, of the cooling channel in the radial direction in relation to the motor.

It has proven expedient for the at least one spacer element together with the motor housing and/or for the at least one spacer element together with the inner wall of the cooling channel to be made of aluminum or an aluminum alloy. Use of aluminum or an aluminum alloy imparts to the motor housing, to the at least one spacer element and/or to the inner wall of the cooling channel a particularly high thermal conductivity. This enables reliable and targeted heat dissipation to the cleaning liquid.

For cost-effective and, from the point of view of manufacturing technology, simple manufacture of the motor pump unit, it has proven advantageous if the at least one spacer element together with the motor housing and/or together with the inner wall of the cooling channel is produced as a die-cast part, in particular, as an aluminum die-cast part. It is particularly preferred for the motor housing, the at least one spacer element and the inner wall to be a one-piece aluminum die-cast part.

In a different preferred embodiment of the motor pump unit in accordance with the invention, the at least one spacer element together with the motor housing and/or together with the inner wall of the cooling channel is produced as an extruded part, in particular, as an aluminum extruded part. Even complex structures of the at least one spacer element can be mass-produced economically by extrusion.

It may also be provided that an inner wall of the cooling channel that faces the motor housing is shrunk onto the at least one spacer element. Formed as shrink-on part from aluminum or an aluminum alloy, for example, the inner wall can be connected in a constructionally simple and, at the same time, robust manner to the at least one spacer element.

In an advantageous embodiment of the motor pump unit in accordance with the invention, the cooling channel may be provided as pipeline, which, in a way, is "jacked up" with respect to the motor housing by the at least one spacer element.

In a different preferred embodiment of the motor pump unit, it is expedient for an inner wall of the cooling channel that faces the motor housing to be configured as an inner shell which surrounds the motor housing, and around the outside of which the cleaning liquid flows. This enables not only constructionally simple design of the motor pump unit, but also reliable heat dissipation to the cleaning liquid. For this purpose, the cleaning liquid can flow around the area of the outer lateral surface of the inner shell. The inner shell may, for example, be formed in one piece with the at least one spacer element or be shrunk onto it.

Preferably, the cooling channel comprises on the side that faces away from the motor housing an outer wall in the form of an outer shell surrounding the inner shell. The outer shell delimits the cooling channel on the outside, so that there is formed between it and the inner shell a gap through which the cleaning liquid can flow. Use of the outer shell allows cost-effective and simple manufacture of the motor pump unit. For example, the outer shell can be slipped over the inner shell and connected to it, for example, by screwing. In particular, in combination with the one-piece construction of the inner shell, the motor housing and the at least one spacer element with one another, a constructionally particularly simple design can thereby be achieved.

The outer shell, the inner shell and the motor housing are advantageously aligned coaxially with one another with respect to a motor shaft of the motor.

It may be provided that two walls arranged on the outside of the inner shell and spaced axially from each other delimit the cooling channel in the axial direction in relation to the motor shaft. The walls delimit the cooling channel axially, i.e., at the end faces and are preferably formed as ribs surrounding the inner shell in the shape of a ring. The walls can preferably be formed in one piece with the inner shell. A one-piece formation with the outer shell may also be provided. Furthermore, it may be provided that sealing elements for sealing between inner shell and outer shell are integrated into the walls.

Expediently, an inlet opening for the cleaning liquid and an outlet opening for the cleaning liquid, through which cleaning liquid can enter the cooling channel and exit from the cooling channel, respectively, are formed in a wall of the cooling channel. Here it is not necessarily a case of "precisely one wall", and so the inlet opening and the outlet opening may also be formed in different walls of the cooling channel.

In addition to the outlet opening, there can be formed in a wall of the cooling channel an emptying opening by way of which the cooling channel opens into a discharge line by means of which it is connected to the suction side of the pump assembly, the cross section of the emptying opening preferably being substantially smaller than the cross section of the outlet opening. If the motor pump unit is shut down, for example, in winter, the cleaning liquid remaining in the cooling channel should, as far as possible, be able to be drawn out of the cooling channel with the pump assembly switched on, without the motor pump unit being connected to a supply hose, so as to avoid damage being caused by cleaning liquid freezing in the cooling channel. This is aided by the emptying opening, so that only such an amount of cleaning liquid remains in the cooling channel that the motor pump unit does not suffer damage even from frost. For this purpose, the emptying opening is expediently arranged below the outlet opening in relation to a position of use of the motor pump unit. During normal operation of the motor pump unit, on the other hand, the flow of cleaning liquid leaves the cooling channel almost entirely through the outlet opening, the cross section of which is significantly larger than that of the emptying opening over and beyond which the cleaning liquid flows.

It has proven advantageous for the inlet opening and/or the outlet opening for the cleaning liquid to be formed in the inner shell. A compact construction of the motor pump unit is thereby achieved. Especially when the inner shell is produced by the aforementioned die-casting process, the inlet opening and the outlet opening can be formed in a constructionally simple manner. The emptying opening may also be formed in the inner shell.

In a different preferred embodiment of the motor pump unit, it may be provided that the inlet opening and/or the outlet opening are formed on one of the aforementioned walls at the end faces of the cooling channel, for example, in one of the ribs surrounding the outside of the inner shell. The same applies to the emptying opening.

It is advantageous if a supply line, which opens by way of the inlet opening into the cooling channel, is arranged in the interspace between the inner shell and the motor housing, and/or if a discharge line, which opens by way of the outlet opening into the cooling channel, is arranged in the interspace between the inner shell and the motor housing. The suction line may, in a way, comprise at least three sections, namely the supply line, the cooling channel and the discharge line, of which the supply line and the discharge line preferably extend between the motor housing and the inner shell. This makes a particularly compact construction possible for the motor pump unit, in which no space is required on the outside of the outer shell for the supply line and/or the discharge line.

It is expedient for walls of the supply line and/or of the discharge line to be at least partially formed in one piece with the inner shell so as to enable a constructionally simple design of the motor pump unit. For example, the supply line and/or the discharge line are produced by the aforementioned die-casting process or extrusion process together with the inner shell.

Furthermore, as compact a construction as possible of the motor pump unit is made possible by the supply line and the discharge line exiting from the interspace on the side that faces the pump assembly. In this way, the discharge line can be connected to the suction side of the pump assembly using a connection line having only a short length. The supply line also exits from the interspace in the direction of the pump assembly, which enables connection of the supply line to a water supply network at the end of the motor pump unit comprising the pump assembly. If the pressure outlet is arranged at the same end of the motor pump unit, the user can connect a supply hose, connected to the water supply network, and the high-pressure hose in a single work step and at the same position of the high-pressure cleaning appliance. This proves advantageous in practice for the handling of the high-pressure cleaning appliance.

The motor pump unit preferably comprises at least one partition wall, which is arranged in the cooling channel, in particular, on the outside of the inner shell, and on whose sides that face away from each other, in relation to the cleaning liquid flowing through the cooling channel, are arranged the inlet opening and the outlet opening. Along the at least one partition wall, the flow of cleaning liquid can be conducted, for example, in a defined manner from the inlet opening to the outlet opening. In particular, the partition wall may extend around the inner shell, so that cleaning liquid entering the cooling channel through the inlet opening can flow around the inner shell before it exits from the cooling channel through the outlet opening. The at least one partition wall makes it possible to ensure that the cleaning liquid will contact the inner shell as long as possible, without flowing directly from the inlet opening to the outlet opening, in order to effectively dissipate the waste heat of the motor.

In a constructionally simple design, the at least one partition wall is expediently formed in one piece with the inner shell, for example, by means of the aforementioned die-casting process or the extrusion process.

It is advantageous if the at least one partition wall surrounds the inner shell helically and, expediently, runs around it at least once. The cleaning liquid is thereby guided at least twice helically around the inner shell, and reliable heat dissipation is enabled.

In the direction of flow of the cleaning liquid from the inlet opening to the outlet opening, flow deflection elements may be arranged in the cooling channel, in particular, on the outside of the inner shell, in order to achieve a serpentine or meandering flow of the cleaning liquid and, consequently, an effective heat dissipation. The flow deflection elements are, expediently, ribs formed in one piece with the inner shell. The flow deflection elements each run, for example, alternately from a first wall of the cooling channel in the direction of an opposite second wall, but without being connected to it, so that the cleaning liquid can flow in a serpentine manner in the cooling channel. In particular, the ribs run axially, starting alternately from one of the aforementioned axial delimiting walls of the cooling channel, and are preferably approximately uniformly spaced from one another in the circumferential direction.

The at least one spacer element is advantageously formed as a radial rib, i.e., as a rib arranged on the outside of the motor housing and extending in relation to the motor shaft in the radial direction away from the motor housing. In practice, it has been found that a robust construction of the motor pump unit with a constructionally simple design can be achieved by the at least one rib. At the same time, reliable heat dissipation from the motor housing to the cooling channel is enabled.

The at least one spacer element is preferably formed so as to extend, in relation to the motor shaft, in the axial direction, i.e., it extends on the outside of the motor housing parallel to the motor shaft. This makes constructionally simple manufacture of the at least one spacer element, in particular, in a die-casting or extrusion process, possible. It is expedient for the at least one spacer element to extend over or substantially over the entire length of the motor, so that a robust construction can be imparted to the motor pump unit. In addition, the heat dissipation from the motor housing to the cooling channel is improved.

In practice, it has proven advantageous for the at least one spacer element to be formed so as to widen in the direction towards the motor housing and/or in the direction towards the cooling channel. Viewed from the interspace, the at least one spacer element forms, as it were, a "base", facing the motor housing, in order to ensure a targeted flow of heat in the direction of the spacer element. In a corresponding manner, the at least one spacer element, starting from the interspace, can widen in the manner of a capital on the side of the cooling channel, so that the heat can be dissipated as far as possible over the surface to the cooling channel and, in particular, the inner shell. For the heat dissipation it does, in practice, prove sufficient for there to be a constriction in the form of a cross-sectional narrowing of the at least one spacer element about halfway between the motor housing and the cooling channel, so as to construct the motor pump unit in a manner which saves as much material and weight as possible.

It has proven particularly preferable for the motor pump unit to comprise a plurality of spacer elements. In practice, it has been found that a better heat dissipation is thereby achieved with manufacture of the motor pump unit nevertheless being constructionally simple.

It is expedient for the plurality of spacer elements to be of identical or substantially identical design.

For a robust construction of the motor pump unit and uniform heat dissipation from the motor housing, it is advantageous if the spacer elements are spaced uniformly from one another in the circumferential direction of the motor, i.e., each two adjacent spacer elements are at the same distance from each other. In this embodiment, the spacer elements are particularly preferably designed as parallel ribs running axially and extending radially.

In an advantageous implementation of the motor pump unit in practice, it has proven expedient for the motor pump unit to comprise approximately 10 to approximately 20, preferably approximately 14 to approximately 18, spacer elements, and, in particular, it may comprise 16 spacer elements. If the spacer elements are uniformly spaced from one another in the circumferential direction of the motor, adjacent spacer elements, consequently, have an angular spacing of approximately 18° to approximately 36°, preferably approximately 20° to approximately 26° and, in particular, of approximately 22.5°. In practice, this proves to be well-suited for a robust construction of the motor pump unit and, at the same time, efficient heat dissipation to the cooling channel.

The present invention further relates to a high-pressure cleaning appliance comprising a motor pump unit. The motor pump unit comprises a motor and a pump driven by the motor, in which motor pump unit the cleaning liquid conveyed by the pump assembly is used for cooling the motor, comprising a motor housing which surrounds the motor, and a cooling channel which surrounds the motor and through which the cleaning liquid can flow for heat dissipation. The cooling channel surrounds the motor housing, and the motor pump unit comprises at least one thermally conductive spacer element by way of which the cooling channel is spaced from the motor housing.

The advantages mentioned in conjunction with the explanation of the motor pump unit in accordance with the invention and of the advantageous configurations of the motor pump unit in accordance with the invention are also achievable with the high-pressure cleaning appliance in accordance with the invention. Reference is made to the above explanations for details of these advantages.

FIG. 1 shows in perspective representation a preferred embodiment of a high-pressure cleaning appliance denoted in its entirety by reference numeral 10. The high-pressure cleaning appliance 10 comprises a preferred embodiment, shown in FIGS. 2 to 4 and denoted in its entirety by reference numeral 12, of a motor pump unit in accordance with the invention.

A supply hose, not shown in the drawings, connectable to a water supply network, can be connected by way of a connection 14 to the high-pressure cleaning appliance 10 in order to supply it with a cleaning liquid such as, in particular, water. Using the motor pump unit 12, the cleaning liquid can be pressurized and discharged by the high-pressure cleaning appliance 10 by way of a high-pressure hose 18 connected to a further connection 16. A spray lance 20 is connected to the high-pressure hose 18 for spraying the pressurized cleaning liquid.

The motor pump unit 12 comprises a motor 22 which is configured as an electric motor and is shown only schematically in the drawings. The motor 22 is known per se and comprises a ring-shaped stator 24 which surrounds a rotor 26 with motor shaft 28. The motor shaft 28 defines a motor axis 30.

The motor 22 is accommodated in a motor housing 32, which is aligned coaxially with the motor axis 30, and to the end face of which a pump assembly 34 of the motor pump unit 12 is flanged. The pump assembly 34 is an axial piston pump, known per se, driven by the motor shaft 28, with a pump block 36 flanged to the motor housing 32. The pump assembly 34 has a pump head 38 on the side facing away from the motor 22.

Connected on the suction side to the pump head 38 is a suction line 40 comprising at its end the connection 14 for the supply hose. Among other things, the suction line 40 comprises a cooling channel 42, which surrounds the motor housing 32, and details of which will be given herein below. The cleaning liquid to be pressurized can be drawn through the suction line 40 into the pump head 38, pressurized therein and discharged by the pump assembly 34 through a pressure outlet 44 which is in flow communication with the connection 16 (not shown).

The motor housing 32 comprises as essential component for encapsulating and protecting the motor 22 a housing shell 46 surrounding the motor 22 in the circumferential direction of the motor axis 30 and extending substantially over the entire length of the motor 22. A plurality of spacer elements 48 protrude in the radial direction, in relation to the motor axis 30, from the housing shell 46 and place the cooling channel 42 at a distance from the housing shell 46. The cooling channel 42 is, in a way, "jacked up" by the spacer elements 48 relative to the housing shell 46. For this purpose, the spacer elements 48 engage an inner wall 50 of the cooling channel 42 that faces the motor housing 32.

The wall 50 is also of shell-like configuration and, in relation to the motor axis 30, is aligned coaxially with the housing shell 46, so that it forms an inner shell 52 of the cooling channel 42 that surrounds the housing shell 46 in the shape of a ring. In this way, the spacer elements 48 form webs 54 which connect housing shell 46 and inner shell 52 to each other in the radial direction.

The webs 54 are each configured as ribs 56 extending in the axial direction on the outside of the housing shell 46 and projecting in the radial direction from the housing shell 46. They are uniformly spaced from one another in the circumferential direction of the motor axis 30. There is, therefore, an identical angular distance between each two respective adjacent ribs 56. As a total of 16 ribs 56 are provided, the angular distance between adjacent ribs 56 is 22.5°.

Figure 2:
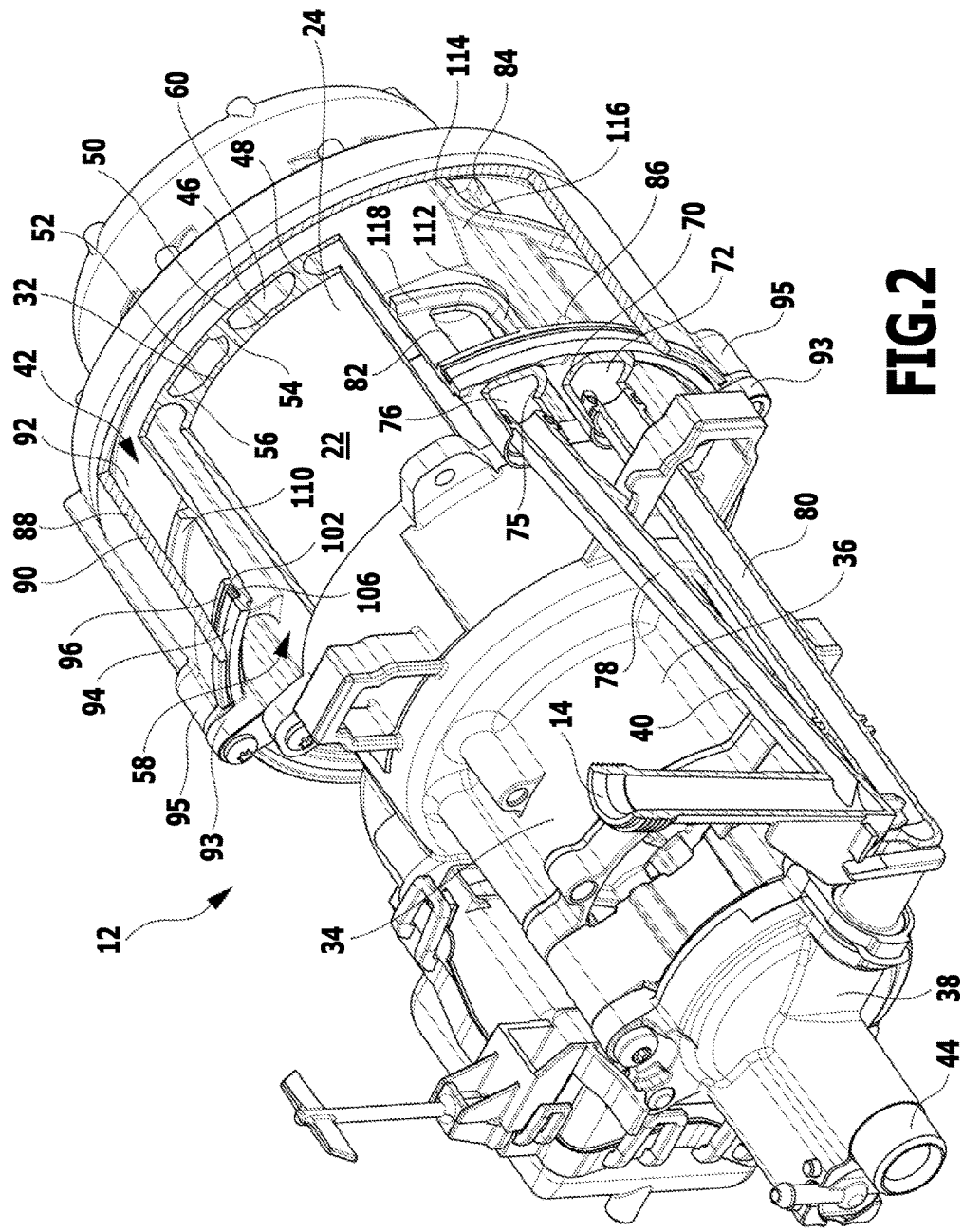
FIG. 2 is a perspective, partly sectional representation of the motor pump unit of the high-pressure cleaning appliance from FIG. 1.
Figure 3:
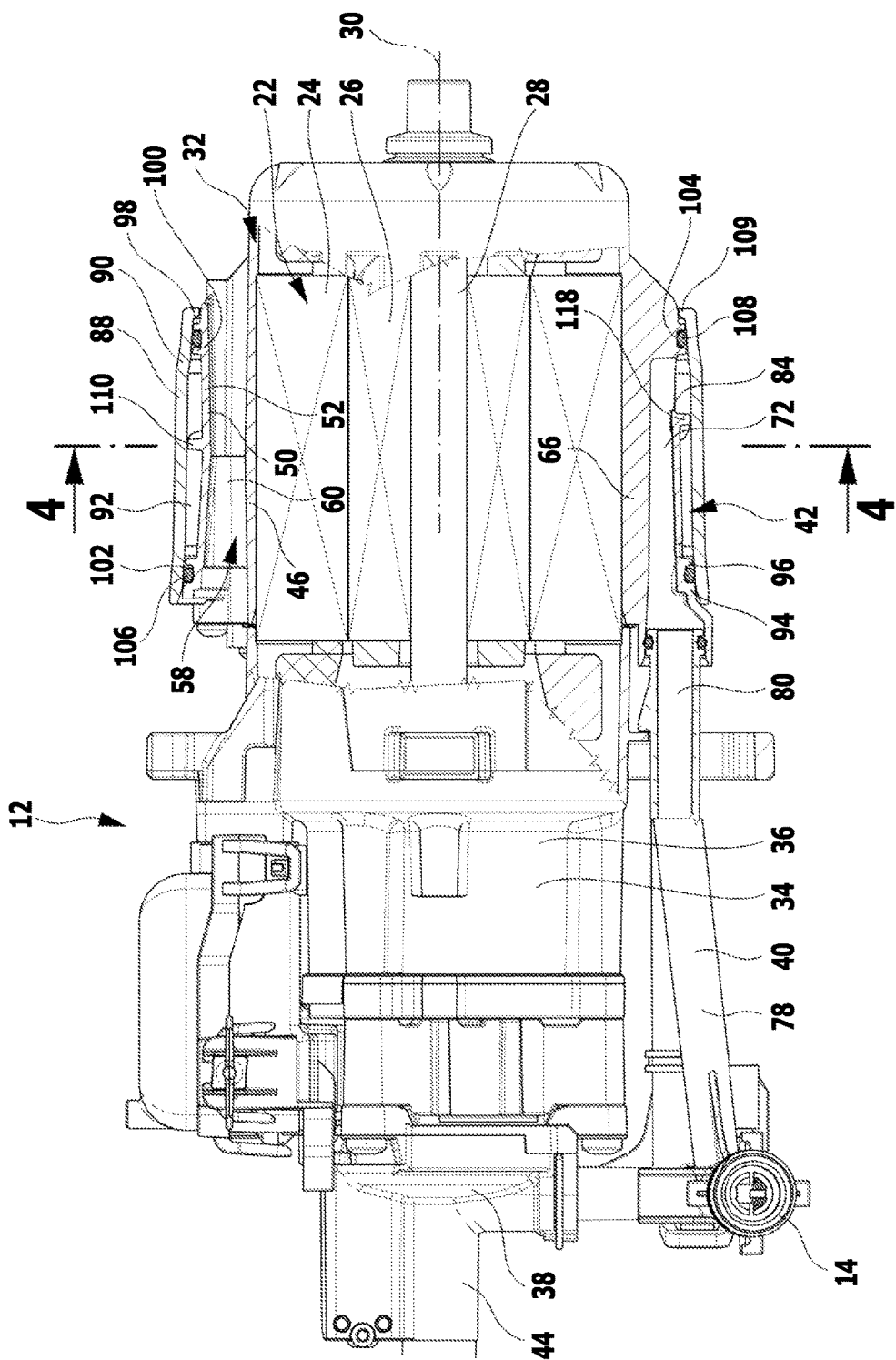
FIG. 3 is a partly sectional, longitudinal side view of the motor pump unit from FIG. 2.

The ribs 56 divide the otherwise ring-shaped interspace 58 between the housing shell 46 and the inner shell 52 into a number of sixteen interspace regions, with an interspace region 60 formed between each two ribs 56. Only close to the connection of the pump assembly 34 to the motor housing 32 do some interspace regions 60 merge into one another, with the ribs 56 delimiting these extending not quite as far as the pump assembly 34 (FIG. 2). The interspace 58 and, consequently, also the interspace regions 60 are filled with gas, in particular, filled with air.

Figure 4:
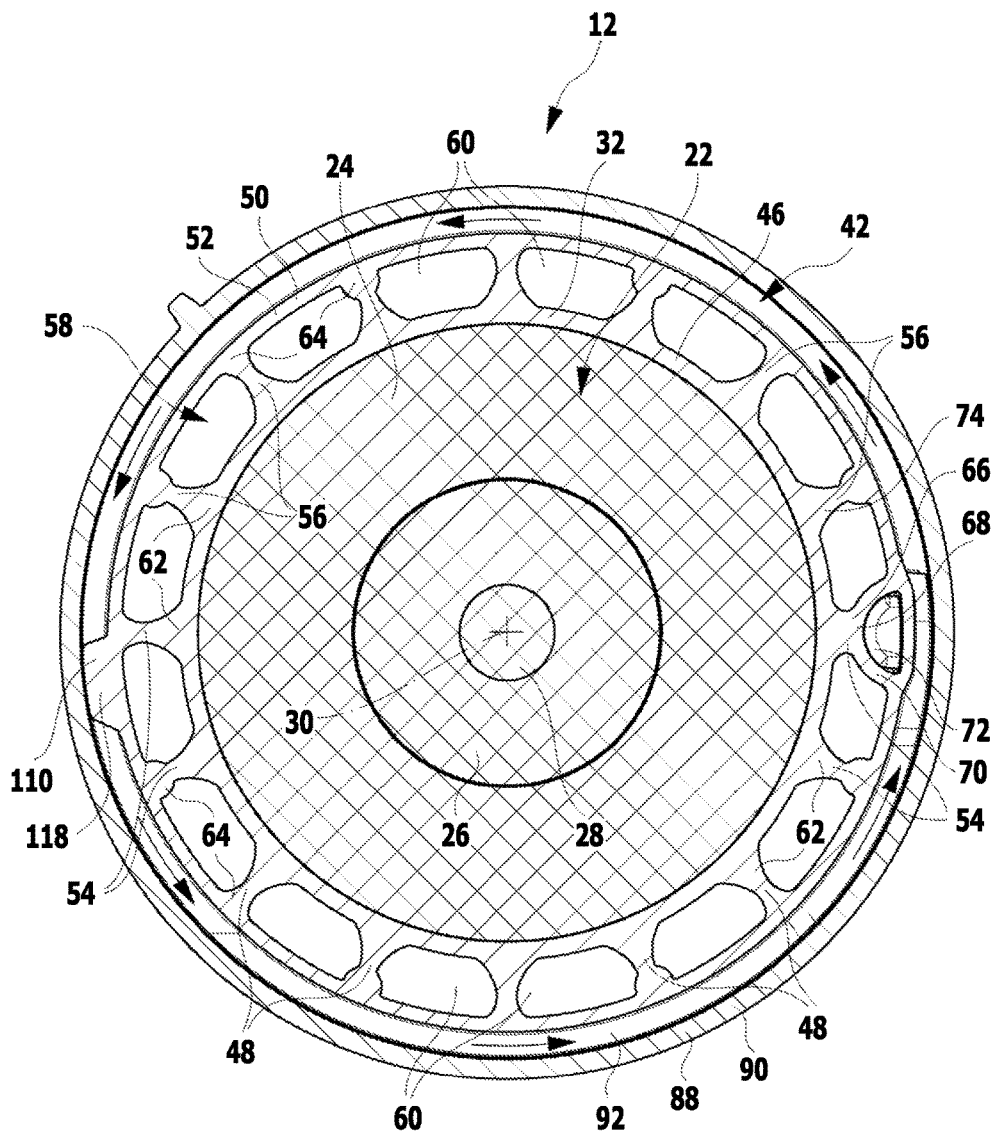
FIG. 4 is a simplified cross-sectional view of the motor pump unit taken along line 4-4 in FIG. 3.

In a cross section extending perpendicularly to the motor axis 30, the ribs 56 have an approximately dumbbell-shaped configuration. In the direction of the housing shell 46 and in the direction of the inner shell 52, the ribs 56 widen, in each case, at a base region 62 and at a capital region 64, respectively, (FIG. 4). The cross section of the ribs 56 is smallest, in each case, about halfway between the housing shell 46 and the inner shell 52.

Features, as explained above, of the ribs 56 apply with the exception of one rib 66 shown at the far right in FIG. 4. The rib 66 continues about halfway between the housing shell 46 and the inner shell 52 at a branching 68 into a wall 70 of a discharge line 72 for cleaning liquid from the cooling channel 42. The discharge line 72 is, therefore, formed on the inner shell 52 radially directly within the inner shell 52, with the inner shell 52 forming an outer wall of the discharge line 72.

Furthermore, features, as explained above, of the ribs 56 apply only to a limited extent to a rib 74 immediately above and adjacent to the rib 66 in FIG. 4. At a branching, not shown in the drawings, the rib 74 continues into a wall 75 of a supply line 76 for cleaning liquid into the cooling channel 42. The supply line 76 cannot be seen in FIG. 4 owing to the axial position of the section, but it is shown in FIG. 2. Therefore, the supply line 76 also runs radially directly within the inner shell 52, which forms an outer wall of the supply line 76.

The discharge line 72 and the supply line 76 both exit from the interspace 58 on the side facing the pump assembly 34. Connected to the end of the supply line 76 is an L-shaped feed line 78 of the suction line 40, which comprises at its free end the connection 14 for the supply hose. Connected to the end of the discharge line 72 is a connection line 80 of the suction line 40, which connects the discharge line 72 to the suction side of the pump head 38.

The supply line 76 opens into the cooling channel 42 by way of an inlet opening 82 formed in the inner shell 52. In a corresponding manner, the discharge line 72 opens into the cooling channel 42 by way of an outlet opening 84 formed in the inner shell 52. The inlet opening 82 and the outlet opening 84 are spaced from each other in the axial direction of the motor axis 30, with the inlet opening 82 lying closer to the pump assembly 34 than does the outlet opening 84. The inlet opening 82 and the outlet opening 84 are also spaced from each other in the circumferential direction of the motor axis 30. Their angular distance is approximately the angular distance of the rib 66 and the rib 74 from each other, which continue into the walls 70 and 75, respectively, of the discharge line 72 and the supply line 76.

Furthermore, the discharge line 72 opens into the cooling channel 42 by way of an emptying opening 86, which can be seen partially in FIG. 2. The cross section of the emptying opening 86 is substantially smaller than the cross section of the outlet opening 84 and is, for example, approximately one tenth to one fiftieth thereof, in particular, one twentieth to one thirtieth thereof During normal operation of the motor pump unit 12, almost no cleaning liquid exits from the cooling channel 42 through the emptying opening 86 into the discharge line 72. This is due to the flow velocity of the cleaning liquid in combination with the comparatively small cross-sectional area of the emptying opening 86 in relation to the cross-sectional area of the outlet opening 84.

On the other hand, the emptying opening 86 is useful when the motor pump unit 12 is to be emptied of cleaning liquid in the cooling channel 42, for example, when it is shut down in the winter. For this purpose, it is common practice to actuate the motor pump unit 12 for a short time without connecting a supply hose to the connection 14, so that cleaning liquid can be drawn out of the cooling channel 42. In this case, in which the cleaning liquid is essentially at rest in the cooling channel 42, the cross-sectional area of the emptying opening 86 is of sufficiently large dimensions for the cooling channel 42 to be freed of cleaning liquid through it. In particular, this is easy to carry out when, as in the case of the high-pressure cleaning appliance 10, the emptying opening 86 is arranged on the side of the inner shell 52 that faces the pump assembly 34, i.e., in the high-pressure cleaning appliance 10 on a side facing its underside, in relation to the position of use shown in FIG. 1. Consequently, cleaning liquid can still be drawn out of the cooling channel 42 through the emptying opening 86 even when the liquid level in the cooling channel 42 has dropped below the rim of the outlet opening 84. In practice, the cooling channel 42 can thereby be emptied of approximately 90% of the cleaning liquid. This is sufficient to prevent damage to the motor pump unit 12 by freezing cleaning liquid in the cooling channel 42.

Beyond the wall 50 in the form of the inner shell 52, the cooling channel 42 comprises on the outside a wall 88 in the form of an outer shell 90. The outer shell 90 surrounds the inner shell 52 in the shape of a ring and at a distance therefrom, so that an annular gap 92 is formed between the outer shell 90 and the inner shell 52. The outer shell 90 is aligned coaxially relative to the inner shell 52 and to the housing shell 46, and in the axial direction it extends over somewhat less than the length of the motor 22.

The outer shell 90 is fixed to the ribs 56 by means of connection elements in the form of screws. For this purpose, four ribs 56 have at their ends on their side facing the pump assembly 34 radial projections for receiving the screws (only two projections 93 shown in FIG. 2). The screws interact with connection elements on the outside of the outer shell 90 in the form of screw domes 95 (two shown in FIG. 2).

The cooling channel 42 is delimited in the axial direction on its side facing the pump assembly 34 by a circumferential wall 94, in the form of a rib 96, arranged between the inner shell 52 and the outer shell 90. At an axial distance therefrom, a circumferential wall 98, in the form of a further rib 100, arranged between the inner shell 52 and the outer shell 90, delimits the cooling channel 42 on its side facing away from the pump assembly 34 Annular grooves 102 and 104 for receiving ring-shaped sealing elements 106 and 108, respectively, are formed in the ribs 96 and 100, respectively. The sealing elements 106 and 108 seal the outer shell 90 off from the inner shell 52. By means of a collar-shaped counterstop 109, the outer shell 90 can be supported, for example, on the rib 100 when it is fixed to the projections 93.

The ribs 96 and 100 are formed in one piece with the inner shell 52 which, in addition, is formed in one piece with the ribs 56 and the housing shell 46. The walls 50 and 75 of the discharge line 72 and the supply line 76, respectively, are also formed in one piece with the inner shell 52, the ribs 56, the housing shell 46 and the ribs 96, 100. The manufacture is carried out by die-casting, in particular, from aluminum or an aluminum alloy. The manufacture of the aforementioned components in one piece enables constructionally simple and, at the same time, cost-effective production of the motor pump unit 12. Production of the housing shell 46, the rib 56 and the inner shell 52 by extrusion, for example, from aluminum or an aluminum alloy, is also conceivable.

Furthermore, a rib 110 extending around the outside of the inner shell 52 is formed in one piece therewith. As will be clear, in particular, from FIGS. 2 and 5, the rib 110, starting from the circumferential rib 96, extends with an axial section 112 first in the axial direction. In doing so, it passes the inlet opening 82. The rib 110 then extends helically around the inner shell 52, running around the motor axis 30 once. In doing so, it passes the outlet opening 84, to continue again into an axial section 114, which ends at the rib 100. An interspace 116 is formed between the axial sections 112 and 114, which extend approximately as extension of each other.

The inlet opening 82 and the outlet opening 84 lie, in relation to the direction of flow of cleaning liquid in the cooling channel 42, on sides of the rib 110 that face away from each other. The rib 110 thereby forms a partition wall 118 for guiding the flow of cleaning liquid in the cooling channel 42. As symbolized schematically by arrows in FIG. 5, the cleaning liquid enters the annular gap 92 through the inlet opening 82 and runs on the left side of the rib 110 once around the inner shell 52, through the interspace 116, and then on the right side of the rib 110 once around the inner shell 52 again, to leave the cooling channel 42 through the outlet opening 84.

The motor pump unit 12 in accordance with the invention and, consequently, also the high-pressure cleaning appliance 10 in accordance with the invention have the following advantages:

As explained, the cooling channel 42 is spaced from the motor housing 32 by the ribs 56, which bridge the interspace 58 between housing shell 46 and inner shell 52. If there is a leakage in the inner shell 52, the cleaning liquid can enter the interspace 58. A leakage in the inner shell 52 may be caused by corrosion owing to the sometimes aggressive cleaning liquid, for example, as a result of a cleaning chemical being added to the water entering at the connection 14. The interspace 58 acts as safety space for the cleaning liquid exiting from the cooling channel 42, which can collect therein, but without entering the interior of the motor housing 32. For, even in the case of a leaking, corroded cooling channel 42, the motor 22 is still sealed off by the housing shell 46.

Even in the event the cooling channel 42 is leaking, the motor 22 is, therefore, protected from the cleaning liquid, and so the level of electrical safety is higher in the motor pump unit 12 in accordance with the invention than in the conventional motor pump units. Since the interspace 58 is filled with air of high compressibility, a large quantity of cleaning liquid can enter the interspace 58. Even in the event of major leaks in the cooling channel 42, the electrical safety of the motor pump unit 12 is thereby ensured.

Nevertheless the waste heat of the motor 22 can be efficiently dissipated to the cleaning liquid in the cooling channel 42. Beneficial for this, on the one hand, is the construction of the housing shell 46, the ribs 56 and the inner shell 52 in one piece from aluminum or an aluminum alloy with high thermal conductivity. The waste heat of the motor 22 can be effectively absorbed by the housing shell 46 and discharged by way of the ribs 56 to the inner shell 52. The construction of the ribs 56 with base region 62 and capital region 64 ensures, on the other hand, that the waste heat is conducted in a targeted manner through the ribs 56 from the housing shell 46 to the inner shell 52.

Owing to the large lateral surface area of the inner shell 52, there is good thermal contact with the cleaning liquid in the cooling channel 42, so that the cleaning liquid can reliably dissipate the heat. It is also beneficial for this that the cleaning liquid, after entering the cooling channel 42 through the inlet opening 82, flows around the inner shell 52 twice before exiting from the cooling channel 42 through the outlet opening 84.

It is also advantageous for the heat dissipation from the housing shell 46 that a gas and, in particular, air with only low thermal conductivity is contained in the interspace 58. Since the thermal conductivity of the ribs 56 made of aluminum or of an aluminum alloy is considerably higher than that of the air in the interspace 58, the heat is dissipated in a targeted manner to the inner shell 52.

It is also of advantage in the motor pump unit 12 that the discharge line 72 and the supply line 76 are also arranged in the interspace 58 and, consequently, on the side of the inner shell 52 that faces away from the outer shell 90. A very compact construction of the motor pump unit 12 can thereby be achieved. Because the walls 50 and 75 of the discharge line 72 and the supply line 76, respectively, are also formed in one piece with the inner shell 52, the manufacture of the motor pump unit 12 is further simplified.

Variants, shown in FIGS. 6 to 8, of the motor pump unit 12 and features thereof will be discussed herein below. Features and components which are identical or functionally identical to those of the motor pump unit 12 are denoted by identical reference numerals.

Figure 6:
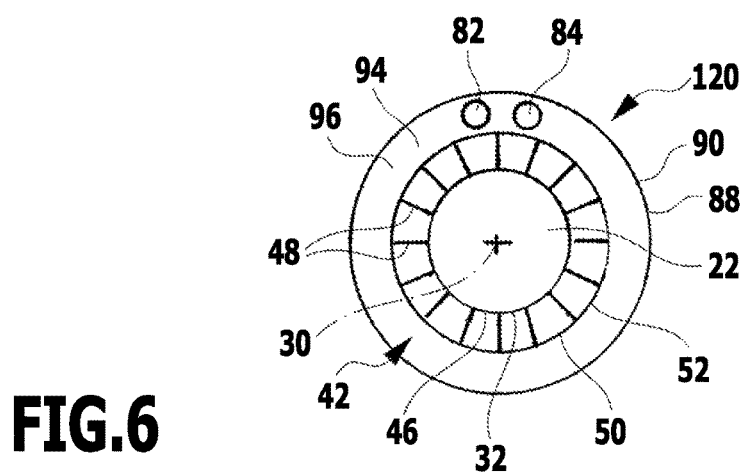
FIG. 6 is a schematic cross-sectional view corresponding to FIG. 4 in a variant of the motor pump unit from FIG. 2.

A variant of the motor pump unit 12, which is shown schematically in FIG. 6 in a manner corresponding to FIG. 4 and is denoted by reference numeral 120, differs from the motor pump unit 12 in that the rib 96 is of larger radial dimensions than in the case of the motor pump unit 12. This makes it possible to form the inlet opening 82 and the outlet opening 84 in the rib 96, so that the feed line 78 and the connection line 80 can be directly axially connected to the cooling channel 42. Aside from that, the motor pump unit 120 is identical in construction to the motor pump unit 12, and the advantages achievable with the latter are also achievable with the motor pump unit 120, for details of which reference is made to the above explanations.

Figure 5:
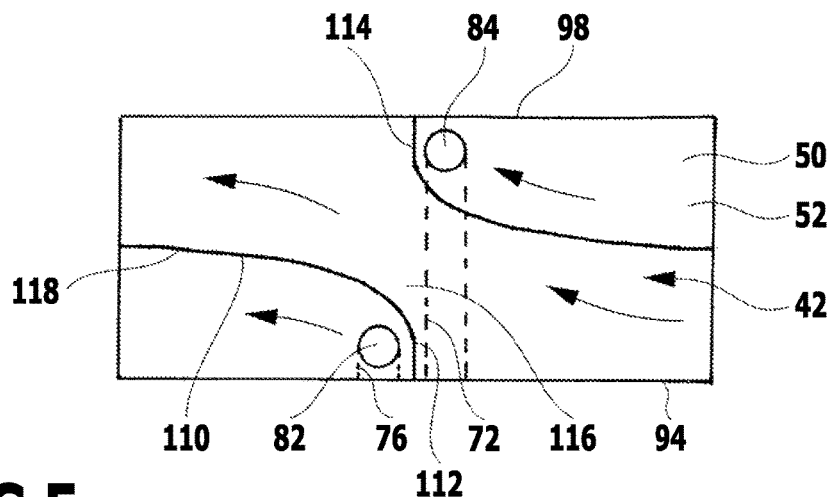
FIG. 5 is a schematic plan view of a shell, cut open and laid flat, of a cooling channel of the motor pump unit from FIG. 2.
Figure 7:
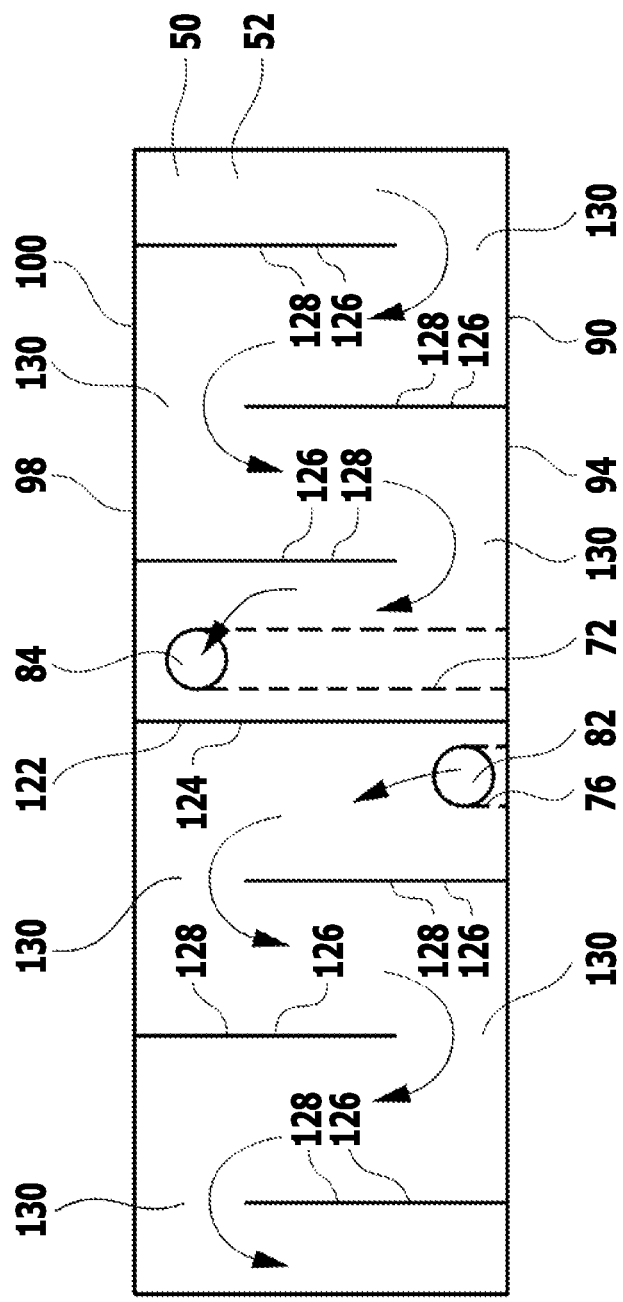
FIG. 7 is a schematic plan view of a shell, cut open and laid flat, of a cooling channel of a further variant of the motor pump unit from FIG. 2.

Of a further motor pump unit only the inner shell 52 is shown in FIG. 7 in a manner corresponding to FIG. 5. In this variant of the motor pump unit 12, instead of the partition wall 118 a different type of partition wall 122 is provided, which extends in the axial direction from the rib 96 facing the pump assembly 34 to the rib 100 facing away from the pump assembly 34, which each axially delimit the cooling channel 42. The partition wall 122 is, for example, constructed as rib 124 formed in one piece with the inner shell 52. Furthermore, the partition wall 122 is arranged between the inlet opening 82 and the outlet opening 84, so that these lie, in relation to the direction of flow of cleaning liquid in the cooling channel 42, on opposite sides of the partition wall 122.

Furthermore, a plurality of flow deflection elements 126 are arranged on the outside of the inner shell 52. These are, for example, configured as ribs 128 formed in one piece with the inner shell 52. A total of six ribs 128 are provided, which, including the partition wall 122, are uniformly distributed in the circumferential direction of the inner shell 52 over the outside thereof.

The ribs 128 run alternately from the wall 94 in the direction of the wall 98 and from the wall 98 in the direction of the wall 94, respectively, but without being connected to the respective other wall. In this way, an axial interspace 130 is formed between the respective rib 128 and the respective wall 94 or 98. A kind of meandering structure is thereby imparted to the outside of the inner shell 52 by the ribs 128. As a consequence of this, the cleaning liquid entering the cooling channel 42 through the inlet opening 82, as symbolized by arrows in FIG. 7, flows in a serpentine manner past the ribs 128 and through the interspaces 130 in the direction of the outlet opening 84. Owing to the resulting increase in the length of time spent by the cleaning liquid in the cooling channel 42, the waste heat of the motor 22 can be dissipated particularly effectively.

Aside from that, the variant of the motor pump unit 12 comprising the inner shell 52 shown in FIG. 7 is identical in construction to the motor pump unit 12, and the advantages achievable with the motor pump unit 12 are also achievable with this variant, for details of which reference is made to the above explanations. The motor pump unit 120 could also comprise the inner shell 52 in accordance with the configuration shown in FIG. 7.

Figure 8:
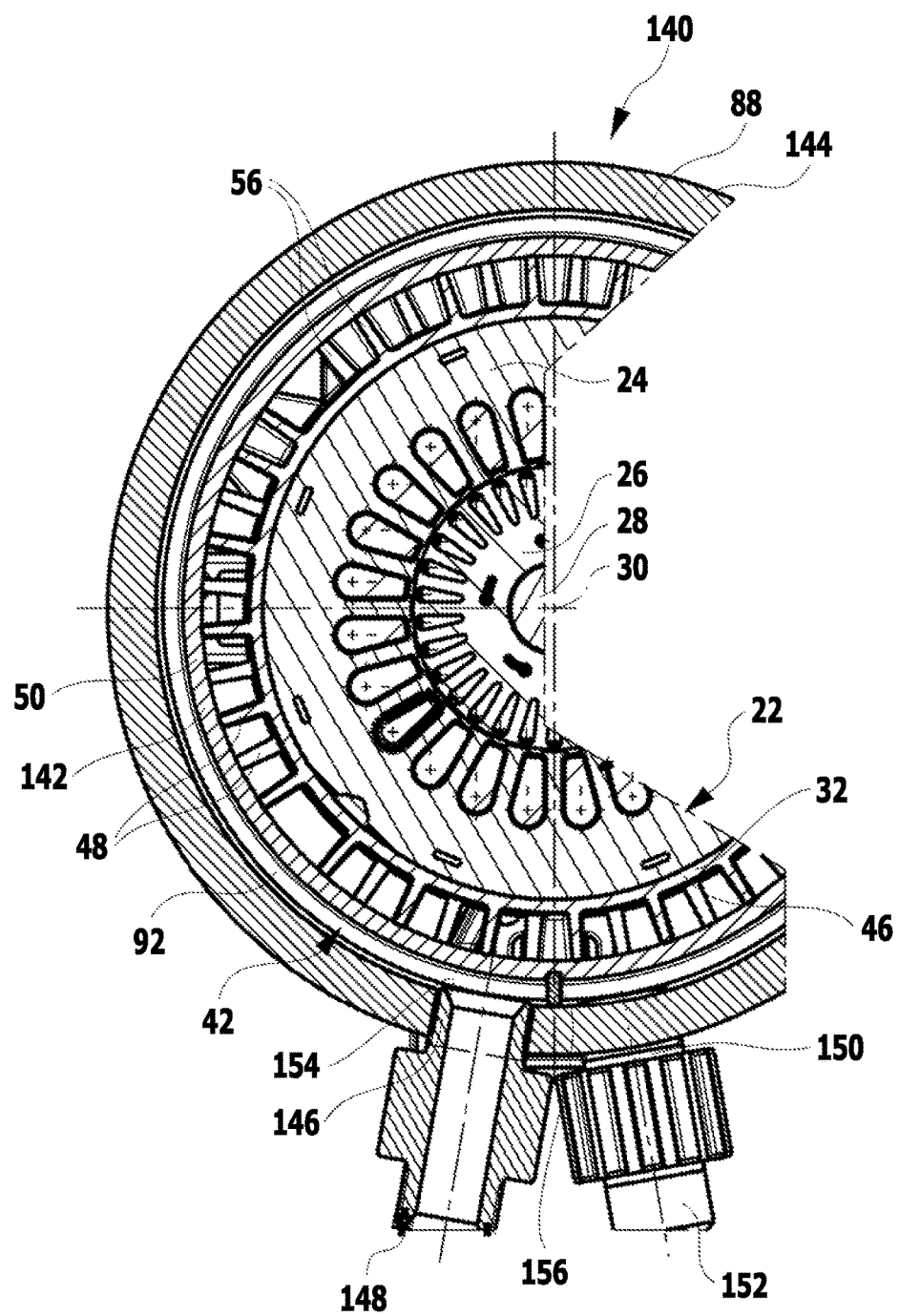
FIG. 8 is a simplified cross-sectional view (partial representation) of a further variant of a motor pump unit in accordance with the invention.

A further variant of the motor pump unit 12 is shown partially in FIG. 8 in a manner corresponding to FIG. 4 and denoted therein by reference numeral 140. The motor pump unit 140 differs from the motor pump unit 12 essentially in that a different kind of inner shell 142 of the cooling channel 42, which forms the wall 50, is used instead of the inner shell 52.

The inner shell 142 is of cylindrical configuration and is aligned coaxially with the housing shell 46. In contrast to the inner shell 52, it is not formed in one piece with the ribs 56, but instead is shrunk onto these. The inner shell 142 is made, for example, of aluminum or an aluminum alloy, so that in the case of the motor pump unit 140, too, the waste heat of the motor 22 can be dissipated particularly effectively to the cleaning liquid in the cooling channel 42. The shrinking-on of the inner shell 142 makes a robust and, from the point of view of production technology, at the same time, simple manufacture of the motor pump unit 140 possible.

In the motor pump unit 140, the wall 88 coaxially surrounding the inner shell 142 on the outside is formed by an outer shell 144. Connections 146 for a supply line 148 and 150 for a discharge line 152 are integrated in the outer shell 144. The supply line 148 and the discharge line 152 are shown only partially in FIG. 8. Cleaning liquid can flow into the annular gap 92 through the supply line 148 and the connection 146 with an inlet opening 154, and cleaning liquid can flow out of the annular gap 92 through the connection 150 with an outlet opening, not shown, and the discharge line 152. The connections 146 and 150 protrude, in relation to the motor axis 30, radially outwardly from the outer shell 144.

Furthermore, in the motor pump unit 140, too, a rib-shaped, axially extending partition wall 156 is arranged on the outside of the inner shell 142 between the inlet opening 154 and the outlet opening, not shown, so that the cleaning liquid cannot flow directly from the inlet opening 154 to the outlet opening.

Aside from that, the motor pump unit 140 may be identical in construction to the motor pump unit 12, and the advantages achievable with the latter are also achievable with the motor pump unit 140. Reference is, therefore, made to the above explanations. In addition, it may be provided that the inner shell 142, like the inner shell 52 in accordance with FIG. 7, comprises the ribs 128, so that the cleaning liquid can flow in a serpentine manner through the cooling channel 42.

That which is claimed:

1. A motor pump unit for a high-pressure cleaning appliance, comprising a motor and a pump assembly driven by the motor, the motor comprising a motor shaft that defines a motor axis;

a suction line connected to a suction side of the pump assembly, the suction side having a connection for connecting a supply hose for supplying a cleaning liquid, the cleaning liquid pressurized by the pump assembly being discharged by a pressure outlet;

a motor housing which surrounds the motor;

a cooling channel as a part of the suction line and through which the cleaning liquid flows for heat dissipation, in order to use the cleaning liquid conveyed by the pump assembly for cooling the motor;

wherein the cooling channel surrounds the motor housing, the cooling channel comprising:

an inner wall that faces the motor housing, the inner wall being configured as an inner shell which surrounds the motor housing;

on the side that faces away from the motor housing, an outer wall in the form of an outer shell surrounding the inner shell, the cleaning liquid flowing between the inner shell and the outer shell;

and wherein the motor pump unit comprises thermally conductive spacer elements by way of which the cooling channel is spaced from the motor housing and which connect the motor housing to the inner shell;

the spacer elements being formed as radial ribs and formed so as to extend in the axial direction, with respect to the motor axis.

2. The motor pump unit in accordance with claim 1, wherein the interspace formed between the motor housing and the cooling channel and bridged by the spacer elements is filled with gas.

3. The motor pump unit in accordance with claim 1, wherein the spacer elements are formed in one piece with the motor housing.

4. The motor pump unit in accordance with claim 3, wherein the spacer elements together with the motor housing is made of aluminum or an aluminum alloy.

5. The motor pump unit in accordance with claim 3, wherein the spacer elements together with the motor housing is produced as a die-cast part.

6. The motor pump unit in accordance with claim 3, wherein the spacer elements together with the motor housing is produced as an extruded part.

7. The motor pump unit in accordance with claim 1, wherein the spacer elements are formed in one piece with an inner wall of the cooling channel that faces the motor housing.

8. The motor pump unit in accordance with claim 7, wherein the elements together with the inner wall of the cooling channel is made of aluminum or an aluminum alloy.

9. The motor pump unit in accordance with claim 7, wherein the spacer elements together with the inner wall of the cooling channel is produced as a die-cast part.

10. The motor pump unit in accordance with claim 7, wherein the spacer elements together with the inner wall of the cooling channel is produced as an extruded part.

11. The motor pump unit in accordance with claim 1, wherein an inner wall of the cooling channel that faces the motor housing is shrunk onto the spacer elements.

12. The motor pump unit in accordance with claim 1, wherein two walls arranged on the outside of the inner shell and spaced axially from each other delimit the cooling channel in the axial direction.

13. The motor pump unit in accordance with claim 12, wherein an inlet opening for the cleaning liquid is formed in one of the two walls, a feed line forming part of the suction line being connected to the cooling channel.

14. The motor pump unit in accordance with claim 1, wherein the spacer elements are formed so as to widen in the direction towards at least one of the motor housing and the cooling channel.

15. The motor pump unit in accordance with claim 1, wherein the spacer elements are spaced uniformly from one another in the circumferential direction of the motor.

16. The motor pump unit in accordance with claim 1, wherein the motor pump unit comprises approximately 10 to approximately 20 spacer elements.

17. A high-pressure cleaning appliance, comprising at least one motor pump unit, the motor pump unit comprising:
- a motor and a pump assembly driven by the motor, the motor comprising a motor shaft that defines a motor axis;
- a suction line connected to a suction side of the pump assembly, the suction side having a connection for connecting a supply hose for supplying a cleaning liquid, the cleaning liquid pressurized by the pump assembly being discharged by a pressure outlet;
- a motor housing which surrounds the motor;
- a cooling channel as a part of the suction line and through which the cleaning liquid flows for heat dissipation, in order to use the cleaning liquid conveyed by the pump assembly for cooling the motor;

wherein the cooling channel surrounds the motor housing, the cooling channel comprising:
- an inner wall that faces the motor housing, the inner wall being configured as an inner shell which surrounds the motor housing;
- on the side that faces away from the motor housing, an outer wall in the form of an outer shell surrounding the inner shell, the cleaning liquid flowing between the inner shell and the outer shell;

and wherein the motor pump unit comprises thermally conductive spacer elements by way of which the cooling channel is spaced from the motor housing and which connect the motor housing to the inner shell;

the spacer elements being formed as radial ribs and formed so as to extend in the axial direction, with respect to the motor axis.

18. A motor pump unit in accordance with claim 12, wherein an outlet opening for the cleaning liquid is formed in one of the two walls, a connection line of the suction line being connected to the cooling channel, the connection line connecting the cooling channel with the pump assembly.

* * * * *